US008891791B2

(12) United States Patent
Olswang et al.

(10) Patent No.: US 8,891,791 B2
(45) Date of Patent: Nov. 18, 2014

(54) COMPUTING DEVICE DOCKING TRAY FOR AUDIO MIXER

(75) Inventors: Benjamin Seth Olswang, Seattle, WA (US); Jeffrey M. Humphrey, Seattle, WA (US); Frank Larry Frederick, Monroe, WA (US); Nathan Pius O'Neill, Snohomish, WA (US); Graham Cyril Jordan, Snohomish, WA (US); Kent Swendseid, Bellevue, WA (US); John Phillip Boudreau, Seattle, WA (US)

(73) Assignee: LOUD Technologies Inc., Woodinville, WA (US)

( * ) Notice: Subject to any disclaimer, the term of this patent is extended or adjusted under 35 U.S.C. 154(b) by 353 days.

(21) Appl. No.: 13/352,992

(22) Filed: Jan. 18, 2012

(65) Prior Publication Data
US 2013/0182872 A1    Jul. 18, 2013

(51) Int. Cl.
*H04B 1/00*    (2006.01)

(52) U.S. Cl.
USPC ......................................................... 381/119

(58) Field of Classification Search
CPC .................... H04R 2205/021; H04R 2430/01; G11B 27/028
USPC ......................................................... 381/119
See application file for complete search history.

(56) References Cited

U.S. PATENT DOCUMENTS

| 5,699,226 | A | 12/1997 | Cavello |
| D553,608 | S | 10/2007 | Williamson |
| D654,077 | S | 2/2012 | Radin |
| 2007/0217145 | A1* | 9/2007 | Sung .............................. 361/686 |
| 2007/0234880 | A1* | 10/2007 | Adams et al. ................... 84/601 |
| 2008/0270664 | A1 | 10/2008 | Carnevali |
| 2013/0154920 | A1* | 6/2013 | Radin et al. ................... 345/156 |

FOREIGN PATENT DOCUMENTS

EP    2 007 045 A2    12/2008

OTHER PUBLICATIONS

European Search Report mailed May 9, 2012, issued in corresponding Application No. EP 12 16 2809, filed Apr. 2, 2012, 8 pages.
Communication Pursuant to Article 94(3) EPC mailed Sep. 22, 2014, issued in corresponding Application No. EP 12 162 809.3, filed Apr. 2, 2012, 7 pages.

* cited by examiner

*Primary Examiner* — Alexander Jamal
(74) *Attorney, Agent, or Firm* — Christensen O'Connor Johnson Kindness PLLC (57) ABSTRACT

An audio mixer (20) include a chassis (22) adapted to receive a docking tray assembly (24), which in turn is adapted to receive a computing device (26). The computing device functions to operate and control the audio mixer (20), and to this end includes a touch screen display (28). The docking tray assembly (24) includes formed tray (110) and, optionally, an adapter configured as a formed insert (112) that nests with the tray (110) to dock a computing device of a configuration different from the computing device docked directly with the tray (110).

18 Claims, 11 Drawing Sheets

COMPUTING DEVICE DOCKING TRAY FOR AUDIO MIXER

TECHNICAL FIELD

The present application relates generally to audio mixers, and more particularly to a portable audio mixer adapted to dock computing devices of different configurations used to operate the mixer and provide an interface for the mixer.

BACKGROUND

In audio mixing, multiple recorded sounds are combined, typically into two-channel stereo. The sounds may originate from musical instruments, vocal sources, or other sources. In the mixing process, the source sounds or signals are typically manipulated, including the level, frequency content, dynamic characteristics, panoramic position, etc. Also, effects may be added to the sound, including reverb and delay effects.

Historically, audio mixing has been carried out in studios on relatively large sound boards and mixing consoles. More recently, digital audio work stations (DAWs) have been used with or without a personal computer. Nonetheless, the DAWs, whether or not computer-based, are not particularly portable. Moreover, the computer-based DAWs still require a board or other hardware device to receive the various audio inputs that are later manipulated and mixed. The present disclosure provides a portable audio mixer that seeks to address these limitations of existing DAWs and computer-based audio mixers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An audio mixer is provided that is adapted to dock a computing device with a screen display. The audio mixer includes a chassis having an audio panel with input connections for a significant number of audio signals, as well as having stereo output connectors. The mixer chassis also includes a control panel having control pots for adjusting the level of the audio signals.

Also, the audio mixer includes a docking tray assembly mounted on the audio mixer chassis for removably docking the computing device. The docking tray assembly is configured to permit access to the screen display of the computer device, which is utilized as an interface for the audio mixer.

In addition, a connector assembly functionally connects the computing device to the mixer chassis when the computing device is docked with the tray assembly. With such connection the computing device functions to operate the audio mixer.

A retainer is provided for retaining the computing device engaged with the mixer chassis when docked with the docking tray assembly. Optionally, the retainer may be in the form of a lock for securely locking the computing device in docked position.

In accordance with a further aspect of the present disclosure, the audio mixer chassis includes a docking tray assembly receiving cavity within the chassis. The docking tray assembly is positionable within the cavity, so that when the computing device is docked with the docking tray assembly, the computing device is within the envelope of the audio mixer chassis.

In a further aspect of the present disclosure, the docking tray assembly is configured to dock computing devices of different configurations. To this end, the docking tray assembly includes a tray attachable to the chassis and configured to dock a computer device of a first configuration. In addition, an adapter cooperates with the docking tray to dock a computing device of a second configuration. The adapter may be in the form of an insert that is configured to closely nest with the tray. The insert enable the second configuration computing device to be docked with the tray assembly without requiring and modification to the computing device or without any spacer or other items to be attached to the computing device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
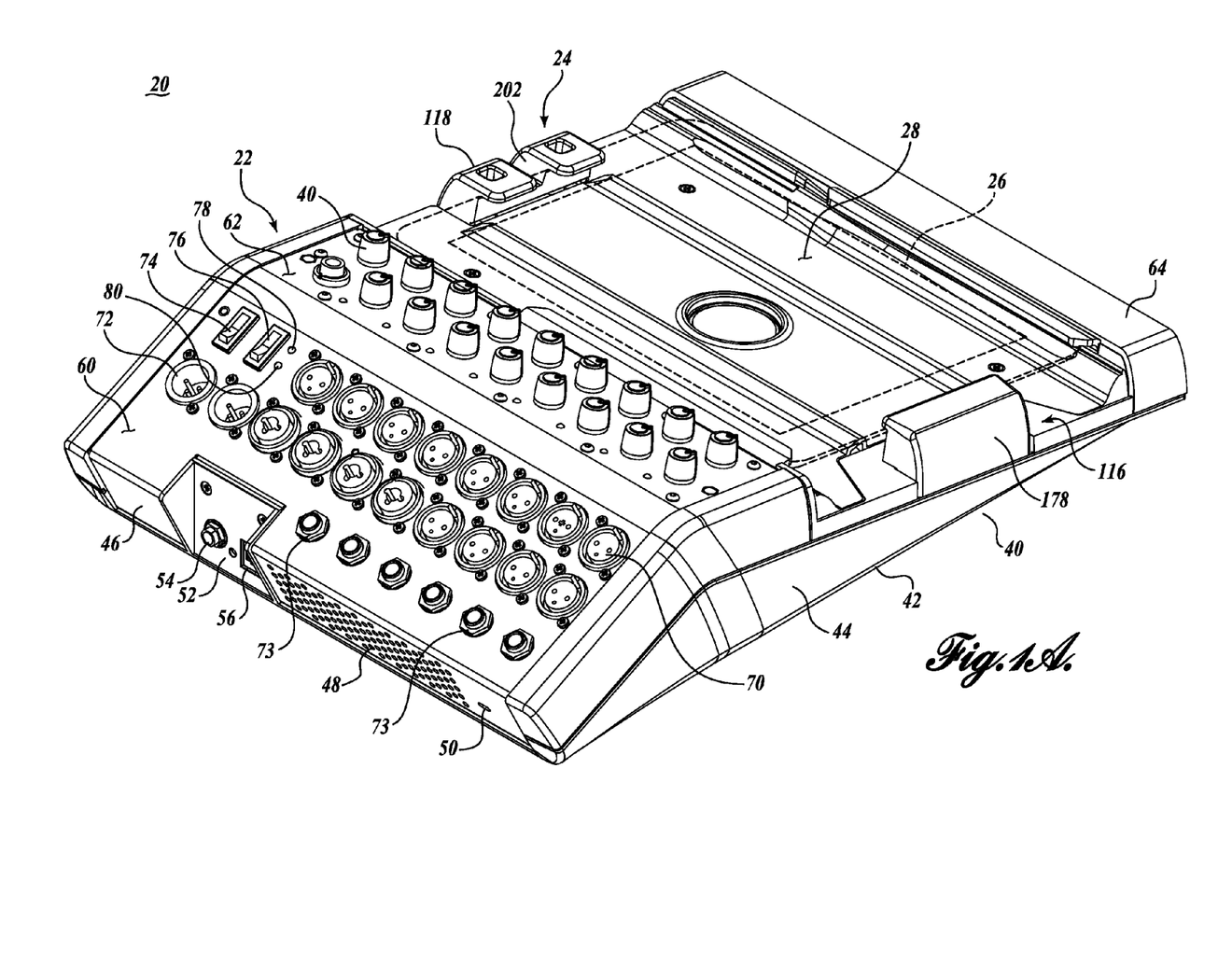
FIG. 1A is an isometric view of an audio mixer utilizing a docking tray assembly for a computing device according to the present disclosure.
Figure 1B:
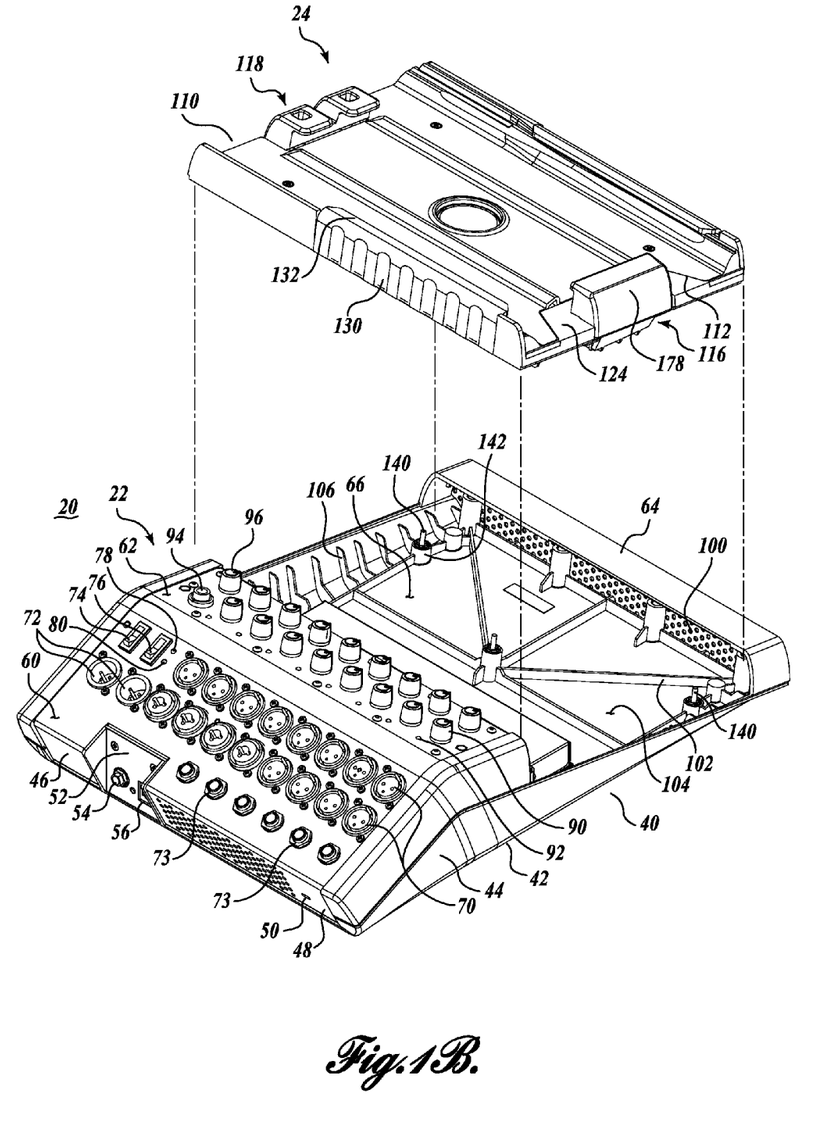
FIG. 1B is a view similar to FIG. 1A, but with the docking tray assembly removed from the chassis of the audio mixer.

An audio mixer 20 in accordance with the present disclosure is illustrated in FIGS. 1A and 1B. The audio mixer includes a chassis 22 adapted to receive a docking tray assembly 24, shown removed from the chassis in FIG. 1B. The docking tray assembly 24 is adapted to receive a computing device 26 shown in broken line in FIG. 1A, since such computing device does not constitute a portion of the present invention per se. The computing device includes a touch screen 28 and functions to operate and control the audio mixer 20.

The computing device 26 may be of various configurations including in the form of a tablet computer as shown in FIG. 1A or in other configurations, for example, in the form of a "smart phone" or a digital personal assistant. The computing device is utilized to operate and control the audio mixer 20. In this regard, the touch screen 28 can function as an interface for the operation and control of the audio mixer. In accordance with the present invention, the chassis 22 and docking tray assembly 24 are designed to accommodate computing devices of various configurations, as described more fully below.

Figure 2:
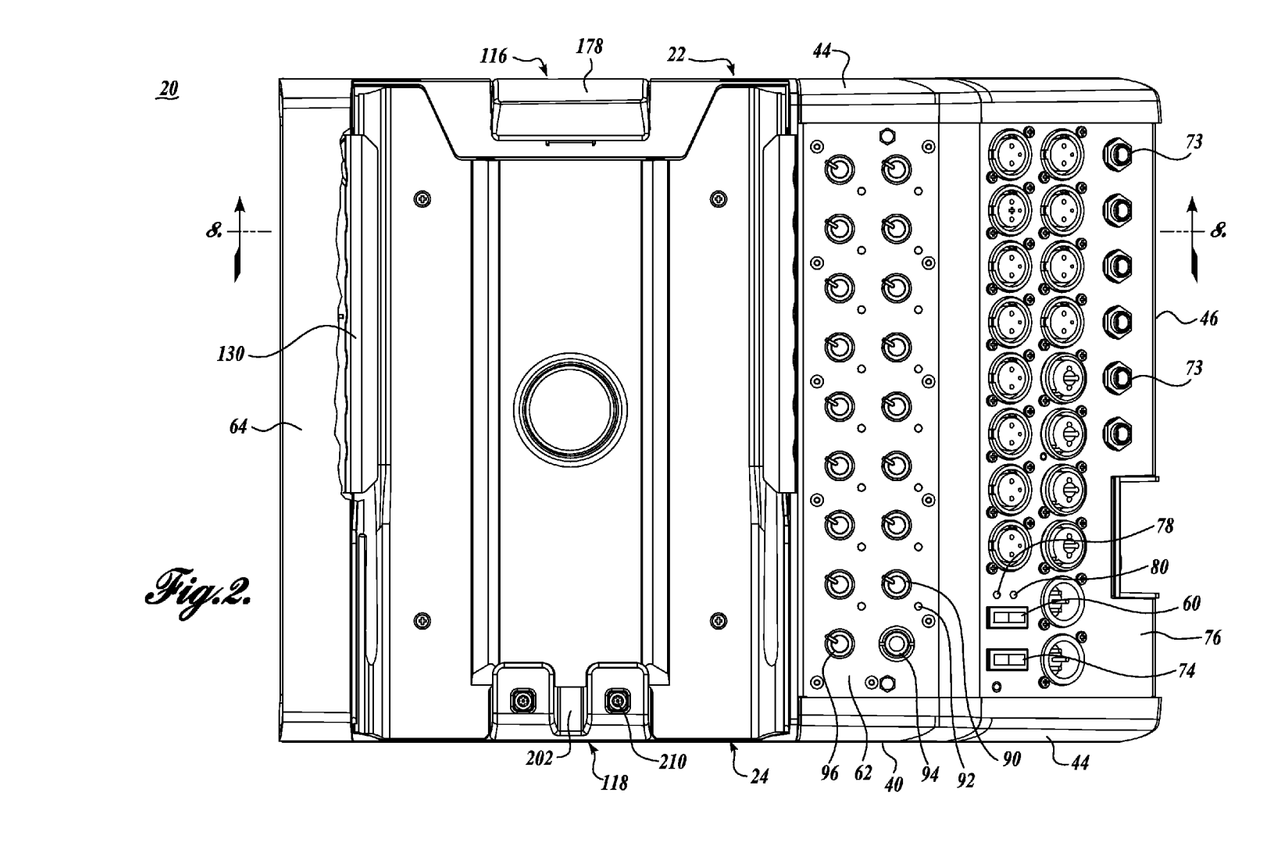
FIG. 2 is a top view of the audio mixer of FIGS. 1A and 1B.
Figure 3:
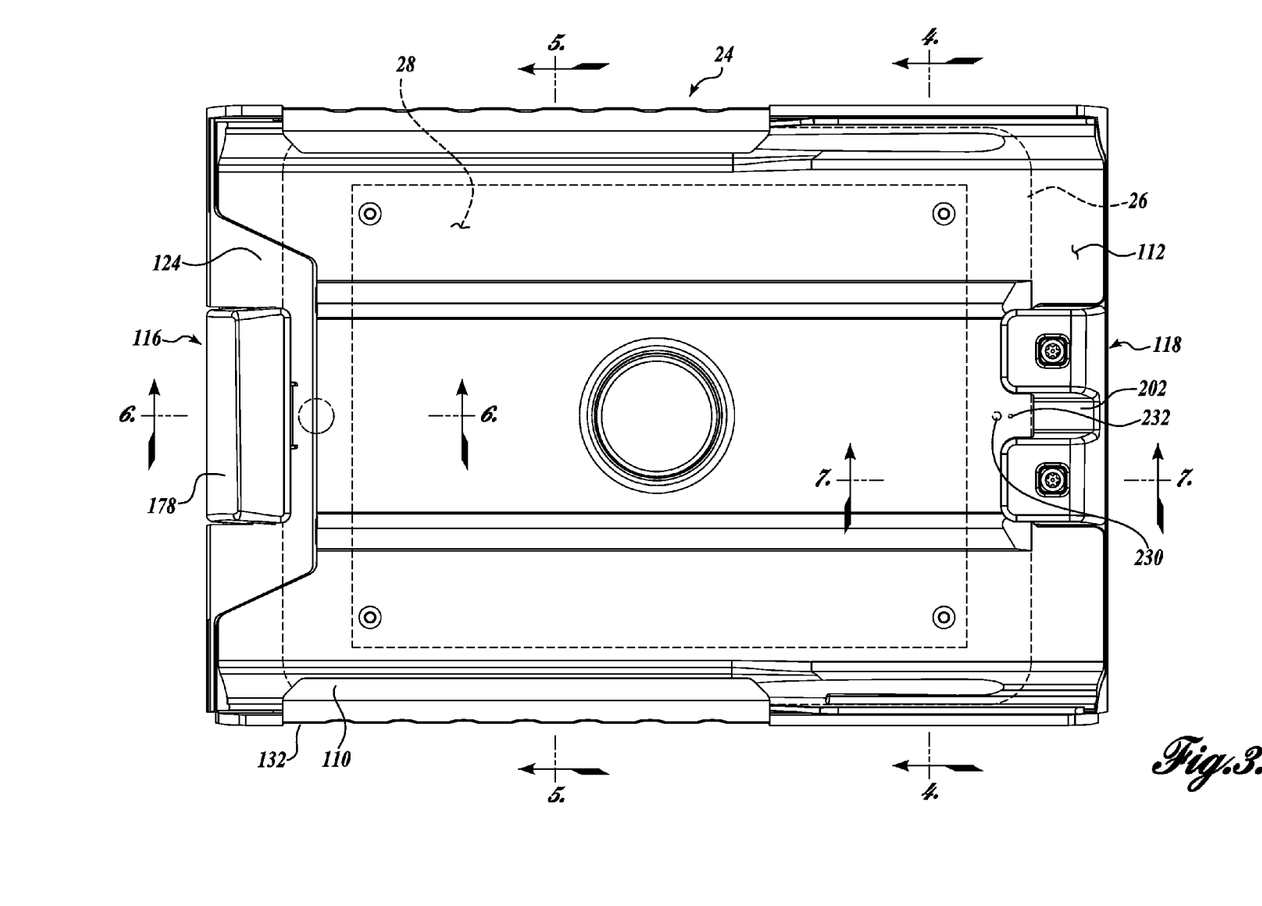
FIG. 3 is a top view of the docking tray assembly.

Referring primarily to FIGS. 1A, 1B, and 2, the chassis 22 includes molded housing 40 having a bottom base or foot 42 that is substantially planar to enable the audio mixer 22 to sit on a flat surface. In side profile, the housing 40 is generally triangular in shape, having sides 44 that intersect a sloped end face 46, a portion of which is composed of a perforated grill 48 shown with circular holes for ventilation. A slot 50 is formed in the grill plate 48 for receiving a security lock, for example, a Kensington lock.

A portion of the end face 46 of the chassis is "cut out" to form a panel 52 that is sloped in reverse to the slope of the end face 46. A first connector 54 is mounted on the panel 52 to receive a power cord for the mixer 20. A network plug 56 is also mounted on the panel 52 beside the power connector 54.

The chassis 22 is formed with two upwardly directed surfaces, a first sloped surface that constitutes the input/output panel 60 and a second, less sloped, but longer discontinuous surface that constitutes a control panel 62 adjacent the input/output panel 60 and a palm rest 64 at the far end of the chassis. A well or opening 66 is disposed between the control panel 62 and palm rest 64 for reception of the docking tray assembly 24, as described more fully below.

A plurality of audio signal input connectors 70 are spaced in two rows across the panel 60. Sixteen connectors are shown which are used for sixteen channel mixing, but it is to be understood that more or fewer such connectors and thus channels may be utilized. As in a typical mixer, these connectors receive signals from microphones, audio equipment, musical instruments, etc. A pair of output connectors 72 are positioned at the end of the lower row of input connectors. A row of auxiliary send outputs jacks or connectors 73 are positioned below the connectors 70. As in typical mixers, one function of the output connectors 73 is to be used to add sound effects, such as reverb, delay or compression, to an audio signal. The signal from the auxiliary send connector is routed an effects unit and then returned to the mixer via input connector to create an effects loop. The output from the connectors 73 can also be routed to an amplifier and then on to monitor speakers. A power toggle switch 74 and a "phantom power toggle switch 76 are positioned above the output connectors 72. Of course, other types of switches may also be placed on the panels 60 as well as various types of indicator lights such as a "power on" light 78 and a "phantom power on" light 80.

Still referring to FIGS. 1A, 1B, and 2, two rows of gain control knobs or pots 90 are arranged across control panel 62. An "on/off" indicator light is associated with each of the knobs/pots 90. The light displays one color when a "standard" signal is present, and a different color when the input signal is too high and clipping. Also, a headphone jack 94 and an associated control knob/pot 96 are positioned at the end of the row of game control knobs/pots 90. As will be appreciated, the gain control knobs/pots 90 are positioned so as to be readily accessible to the user when utilizing the screen 28 of the computing device 26 as an interface device. Moreover, the palm rest 64 provides a surface for the user's palm when using the screen display 28 as an interface, for example, as a keyboard.

As shown in FIG. 1B, the end of the housing 40 adjacent the palm rest 64 is covered by a grill 100 having a pattern of circular perforations, which provides ventilation to the well area 66 of the chassis. A plurality of ribs 102 radiate from a center location on the inside surface 104 of the foot 42. Also, a plurality of stiffening ribs 106 extend transversely to the inside surface of the side wall 44 along the well area. Of course, other stiffening ribs and reinforcements may be utilized with respect to the housing 40.

Next, referring primarily to FIGS. 1B and 4-11, the docking tray assembly 24 includes a formed tray 110 and, optionally, an adapter in the form of a tray insert 112 to dock a computing device of a configuration different from the computing device docked directly to tray 110. An electromagnetic emissions shield 114 is positioned at the underside of the tray, and a connector bus assembly 116 is located at one end of the tray assembly 24, with a computing device lock c118 located at the opposite end of the tray assembly.

The tray 110 is illustrated as a molded component. However, the tray can be produced by other techniques, such as by stamping, and/or can be composed of discrete components that are integrated together to form a uniform tray structure. As perhaps most clearly shown in FIGS. 4-7 and 9, the tray 110 includes a generally rectilinearly shaped, substantially flat base 122. The central end portion of the tray base 122 adjacent connector bus assembly 116 is raised somewhat in elevation to form a shelf or platform 124 extending above the surface above the rest of the tray base. Correspondingly, in the underside of the tray 110, the base 122 is recessed, see FIG. 11.

A pair of ribs extend parallel to each other and longitudinally of the base 122. The ribs 126 function as support rails and reduce the bearing surface against the underside of computing device 26, thereby facilitating the docking of the computing device by the sliding engagement of the computing device with the docking tray assembly 24. Other numbers of ribs can be utilized rather than the two ribs 126. Of course, the ribs 126 add a certain amount of stiffness to the tray base 122.

Formed side walls 128 extend upwardly from the side margins of the tray base 122. The configuration of the side walls 128 differ along the length of the side walls. Toward the end of the tray 110, adjacent the connector bus assembly 116, the side walls include an undulating or "wavy" section 130. A guide or retaining flange 132 extends laterally inwardly from the upper edge portions of wall section 130. The wall section 130 provides a convenient way of controlling the overall width between the side walls 128 so as to closely correspond to the width of the computing device 126, thereby to constrain lateral movement of the computing device as it is docked with the tray and also once fully docked. The mold utilized to form the wall section 130 can be relatively easily adjusted to alter the width across the tray 110.

The guide or retaining flanges 132 restrain the computing device from raising in the upward direction away from the base 122. By limiting the length of the retaining flange 132 to that of wall section 130, the sliding friction between the computing device and the flanges is not so significant to make it difficult to slidably dock the computing device with the docking tray assembly 24, or de-dock the computing device from the tray assembly. Nonetheless, the length of the retaining flange 132 is sufficient to hold the computing device securely within the docking tray assembly 24.

Figure 11:
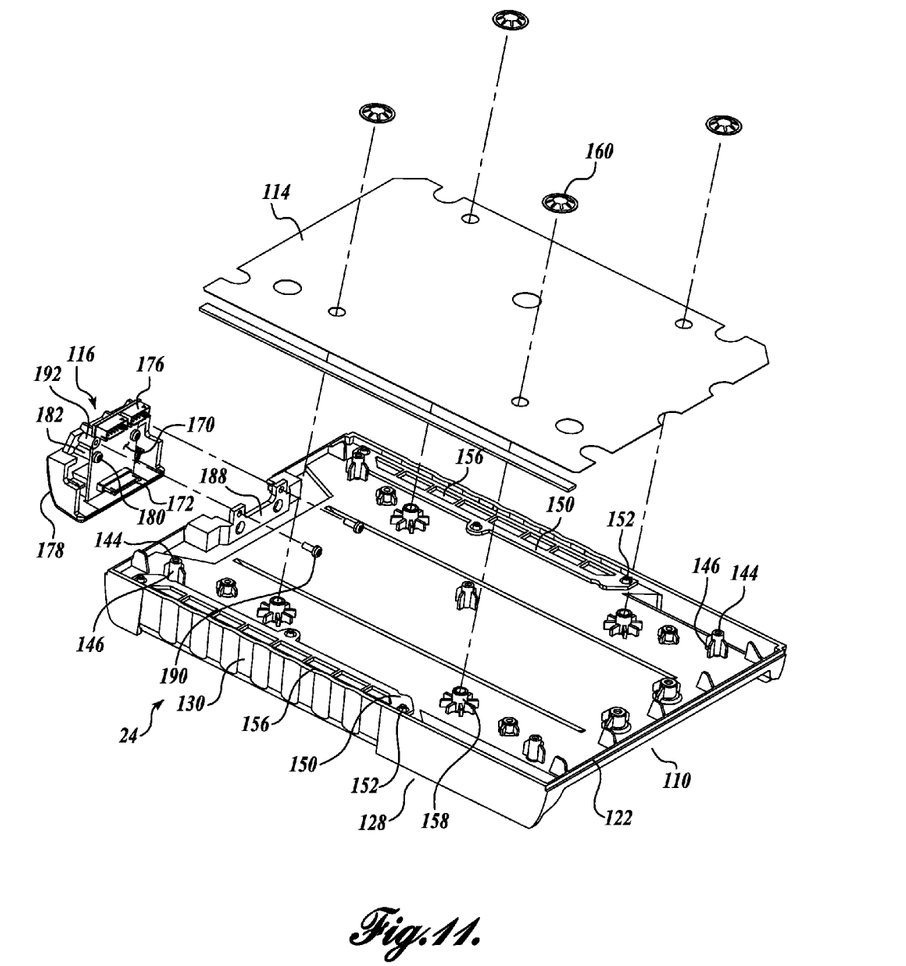
FIG. 11 is an isometric view of the underside of the docking tray assembly with components exploded away.

An interior fillet or a rounded shoulder 134 extends along the interior of the side wall 128 and its intersection with base 122, from the wall section 130 to the end of the tray 110. As shown in FIG. 11, at the underside of tray base 122 the area beneath the rounded shoulder 134 is recessed to correspond to the shape of the shoulder 134. The shoulder 134 serves as a bearing surface for the side portions of the computing device 26. See FIG. 5B. The end 136 of the shoulder 134 is in the form of a solid face so as not to create an opening thereat.

The tray 110 is mountable within the well 66 of the chassis 22. In this regard, as shown in FIGS. 1B and 11, a plurality of screws 140 extend upwardly from bosses 142 which in turn project upwardly from the upper surface of foot 42. The screws 140 engage within corresponding threaded holes 144 in bosses 146 that project downwardly from the underside of the tray base 122. The screws 140 may be of the self-tapping type to form their own threaded holes 144. Of course, other means may be utilized to retain the tray 110 in place, for example, through the use of drive pins or other types of hardware members in place of the screws 140.

Referring specifically to FIG. 11, perforated cover strips 150 are used to substantially close off elongated openings formed along the side margins of the tray base 122 beneath the undulating sections 130 of the side walls. The cover strips 150 prevent access to the interior of the chassis housing 140 when the docking tray assembly 24 on the chassis 22 is in place but the computing device 26 is not docked. The cover strips 150 can be held in place by any convenient means, such as through rivets or hardware members 152 located at the ends and along the length of the cover strips.

Also referring to FIG. 11, a substantially flat shield 114 is attached to the underside of the tray base 122. The shield serves to limit electromagnetic signals or emissions between the computing device and the interior of the audio mixer 20. To mount the shield, over-sized circular openings 156 are formed in the shield through which cylindrical stub pins 158 project from the tray base. A push nut 160 can be used to functionally lock against the exterior of the stub pins 158 to thereby hold the shield 114 in place. Of course, other convenient locking means can be utilized to attach the shield 114 to the underside of the tray base 122.

Referring primarily to FIGS. 6, 8, 9, and 11, as noted above, connector bus assembly 116 serves to operably interconnect the computing device 26 with the audio mixer chassis 22. The connector includes a printed circuit board (PCB) 170 on which is mounted a bus connector 172 to engage with the bus port 174 of the computing device 26, see FIGS. 6 and 9. A pair of pin connectors 176 are mounted on the lower portion of the PCB 170 for connecting to bus lines, not shown, of the audio mixer. The PCB 170 includes appropriate interconnections between the pin connectors 176 and the bus connector 172. The PCB 170 is mounted to a cover or housing 178 by hardware members 180 that extend through openings formed in the sides of the PCB to engage within openings formed in bosses 182, which project from the cover. The cover 178 is in turn mounted to the tray 110 by hardware members 184, which extend through openings formed in the offset end portions of an upper mounting bracket 186 that projects upwardly from the shelf portion 124 of the tray base 122, see FIG. 9. The cover 178 is also connected to a second, lower bracket 188 projecting below the tray bore 122, see FIG. 11. Hardware members 190 that engage with bosses 192 formed in the lower portion of cover 178, see FIG. 11. As can be appreciated by the foregoing, the bus connector 116 is securely attached to the docking tray 110.

It will be appreciated that when the computing device 26 is docked with the tray assembly 24, the bus connector 172 is automatically in alignment with the bus port 174 of the computing device, and thus engages with the bus port as the computing device is slid in full engagement with the docking tray assembly to the position shown in FIGS. 1, 2, 3, and 10. In this regard, the tray sidewall sections 130 present a series of vertical ribs to the sides of the computing device to keep the computing device in precise lateral position while the computing device is docked with the tray assembly so as to help insure proper alignment of the bus connector 172 with the bus port 174. The shoulders 134 of the tray and the shoulders 250 of the insert also help properly position the computing device in both the vertical direction and side-to-side in the tray 110/insert 112 to also help insure that the bus connector 172 is in precise alignment with the bus port 174. As a consequence, there is no need of the user to seek to guide the computing device into the correct position during docking to align the bus connector 172 with bus port 174. Damage can result to these components if the alignment between the bus connector 172 and bus port 174 is not sufficiently precise when the user pushes the computing device into fully docked position.

It is also to be appreciated that other means can be utilized for interconnecting the bus plug of the computing device with the audio mixer chassis. Moreover, the location of, shape, configuration, size of the bus connector 172 may be readily adapted to computing devices of different configurations. Other computing devices may utilize a USE port as a bus port, and thus the bus connector can be readily adapted to engage with such port. Further, such USB port may be located at other positions about the computing device rather than at the center of one end, as depicted in the above figures.

As shown in the figures, the bus connector assembly 116 is located centrally along one end of docking tray 110. By positioning the connector bus assembly 116 in this manner, the user can gain access to the end edge of the computing device 26 to conveniently push against the computing device when dedocking the computing device from the tray assembly 24. Dedocking is accomplished by sliding the computing device along the docking tray 110, thereby disengaging the bus connector 172 from the bus port 174 of the computing device, and thereafter pushing the computing device beyond the opposite ends of guides 132, thereby to free to computing device from the tray 110.

Figure 7:
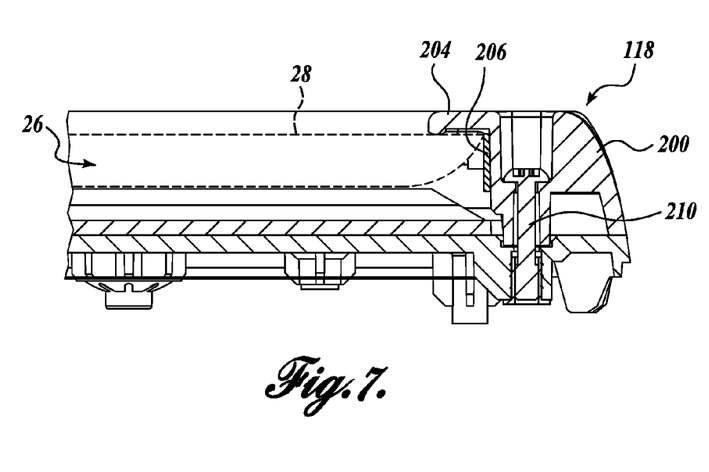
FIG. 7 is a further cross-sectional view of FIG. 3 taken along lines 7-7 thereof.
Figure 8:
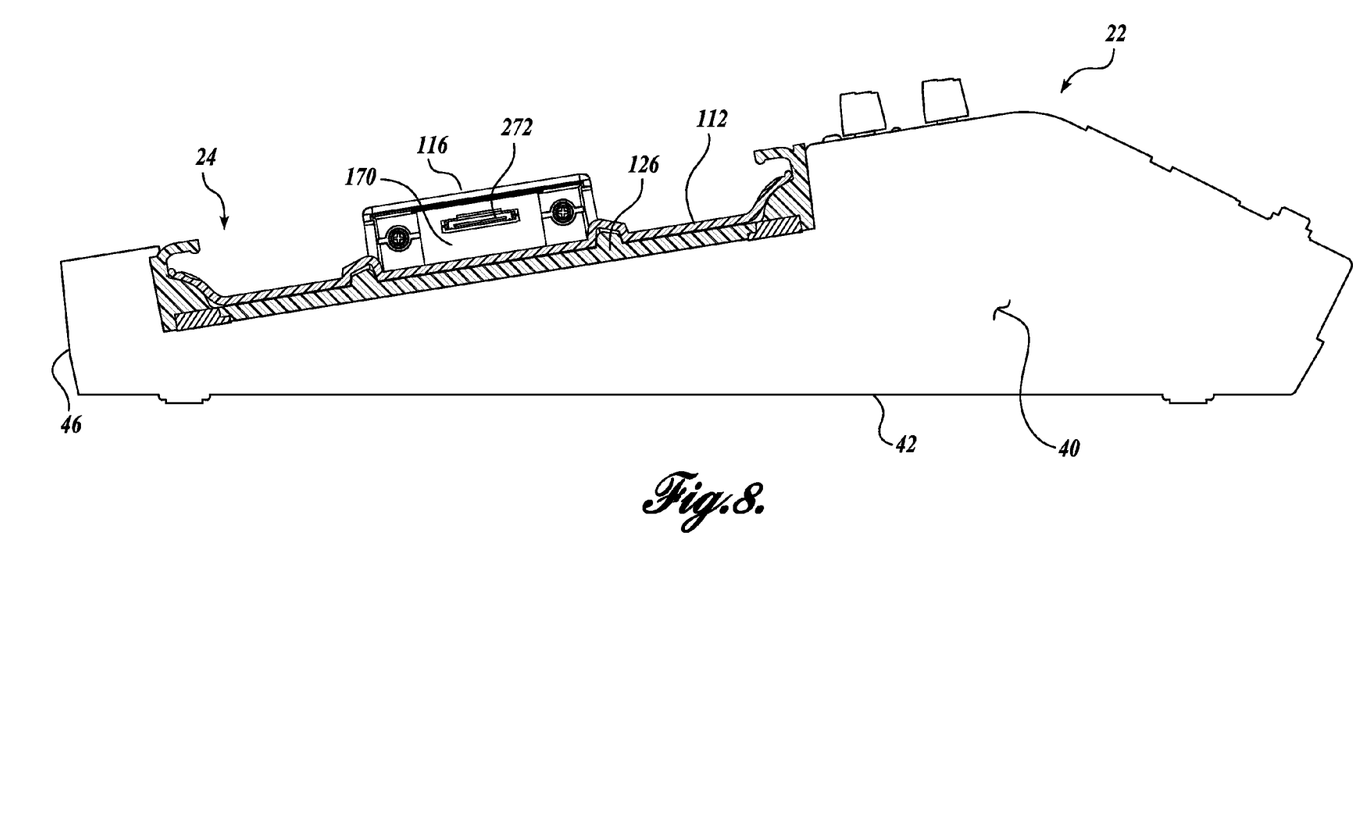
FIG. 8 is a cross-sectional view similar to FIG. 4 wherein the docking tray assembly is shown positioned on the audio mixer chassis.

As shown in FIGS. 1A, 2, 3, 7, and 10, computing devices lock 118 is employed to retain the computing device docked with the docking tray assembly 24. As shown in the figures, lock 118 includes a body portion 200 that is generally rectilinear in shape, but with a center slot 202 that extends downwardly from the top of the body portion to divide the body portion into side-by-side lugs. Top retainers or flanges 204 project from the body portion to overlap the underlying portion of the computing device 26. It will be appreciated that the flanges 204 project far enough over the top of the computing device, thereby to constrain the upward movement of the computing device 26 relative to the tray 110. Also, as shown in FIG. 7, a resilient pad 206 may be mounted on the side of the body 200 adjacent the computing device to provide a snug fit against the computing device. Also, the pad 206 can be employed to accommodate computing devices of different lengths, or variations in the lengths of computing devices.

The lock 118 is secured to the docking tray 110 by special hardware members that extend downwardly into relatively deep counter-bores formed in the body to engage with threaded openings formed in docking tray base 122. It is to be appreciated that the counter-bores are designed to make access to the hardware members 210 difficult to achieve. Moreover, the hardware members can be fabricated with uncommon or specially designed sockets or head shapes to require a special tool to both engage and disengage the hardware members 210 from the docking tray 110. It will be appreciated that, rather than utilizing special hardware members 210, other attachment means can be employed, including locks that require a key or other device to detach the lock 118 from the docking tray 110.

The slot 202 formed in the body 200 of the lock is designed to avoid interference with a camera opening 230 or with light sensor 232 located in the adjacent center perimeter portion of the computing device. Moreover, by restricting the lock 118 to the central portion of the docking tray 110, access is not hindered to an on/off switch 234 or an audio plug 236, located in the adjacent end portion of the computing device, see FIG. 10. Of course, the lock can be of other shapes or configurations in addition to that disclosed in the present application.

It is to be understood that although lock 118 is an advantageous feature for use with the docking tray assemble, the present invention can function without the presence of lock 118. In this regard, a means could be employed to restrict the longitudinal (sliding) de-docking movement of the computing device 26 relative to the docking tray assembly 24 and keep the computing device engaged with the docking tray assembly 24. Such means could be of various configurations.

Referring specifically to FIGS. 4, 5A, 8, 9 and 10, the docking tray assembly 24 optionally includes an adapter for enabling computing devices of other configurations to be used in association with the docking tray assembly 24. In one configuration, the adapter may be in the former of an insert 112 that is designed to closely overlie or nest with the base 122 of docking tray 110. As illustrated, the insert 112 is generally rectilinear in shape and is molded or otherwise formed to generally correspond to the upper contour of the tray base 122 and portions of the contour of the tray side walls 128. In this regard, the insert 112 includes a pair of longitudinal, parallel ribs 240 that extend upwardly from a base 139. The ribs are shaped to nest over the ribs 126 of the tray 110. See FIGS. 4 and 5A. The ribs 240 serve the same purposes as ribs 126, as described above. The insert base 239 includes a central, circular opening 242 corresponding to the location of a design or emblem that may be utilized within a circular perimeter 244, located in tray base 122. This design or emblem may be in the form of a logo or other signage. The insert is securely held in place by hardware members 243 that extend downwardly through holes 245 formed in the insert base 239 to engage with threaded holes 247 formed in the tray base 122. The hardware members can be in the form of screws or other types of common fasteners. It will be appreciated that in this manner the insert will not shift, float or otherwise move relative to the docking tray and thus also not move relative to the chassis 22.

Figure 9:
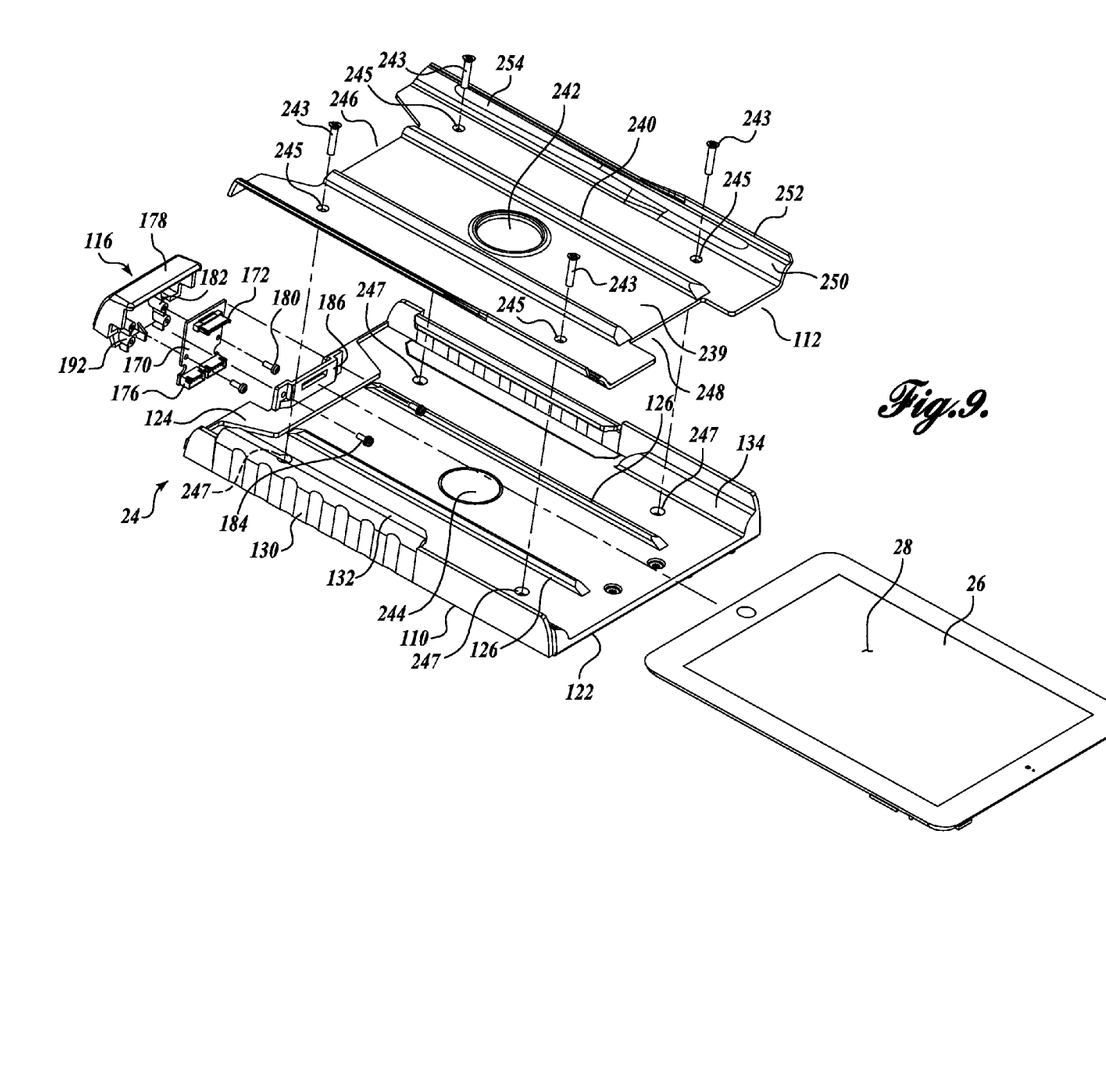
FIG. 9 is an exploded isometric view of the docking tray assembly.
Figure 10:
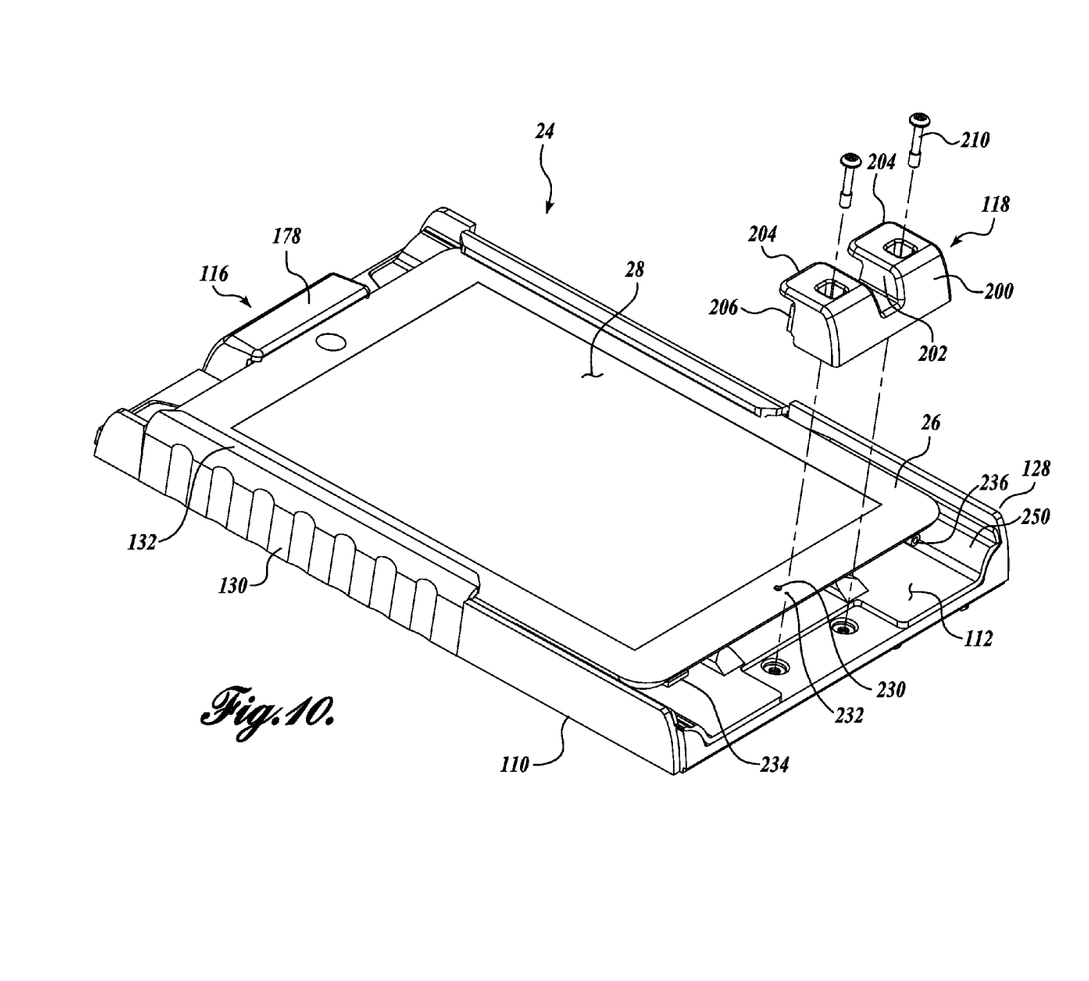
FIG. 10 is an isometric view of the docking tray assembly with the computing device docked with the docking tray assembly, but with the lock removed therefrom.

A generally V-shaped, truncated cutout or notch 246 is formed in the distal end of the insert base 239 to generally match the shape of the shelf or platform 224 formed in the tray base 122. A generally rectangular-shaped cutout or notch 248 is formed in the proximal end of the insert base 139, as shown in FIGS. 9 and 10. The purpose of the cutout 248 is to provide clearance for the lock 118, described above.

Figure 4:
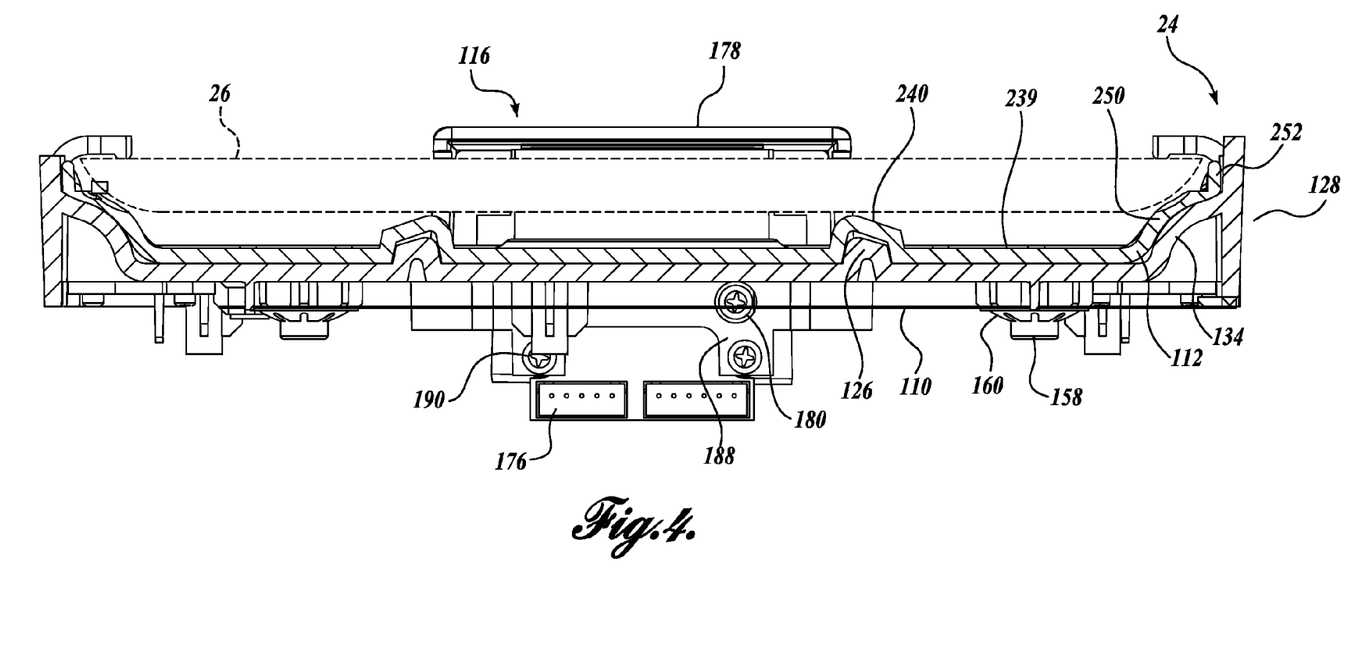
FIG. 4 is a cross-sectional view of FIG. 3 taken along lines 4-4 thereof.
Figure 5A:
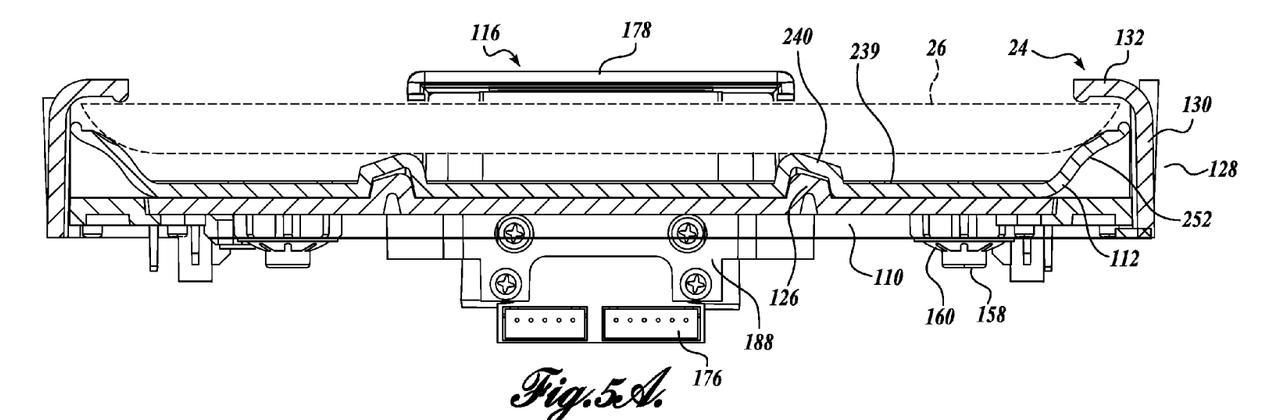
FIG. 5A is a second cross-sectional view of FIG. 3 taken along lines 5-5 thereof.

A rounded shoulder 250 extends along the sides of the insert 112 at the intersection of base 239 and truncated side wall portions 252 at the proximal end portion of the insert 112 shown in FIG. 9. The shoulders 250 overlie corresponding shoulders 134 formed in the tray 110. An elongated slot 254 extends for the majority of the length of the shoulders 250, thereby to reduce the contact area between the shoulders 250 and the underside of the computing device 26 while still supporting the computing device at the proximal and distal ends of the shoulder 250. Also, the slots 254 provide clearance for control buttons that may be located on the sides of the computing device. In this manner the control buttons are not depressed as the computing device is slidably docked with the docking tray and also once the computing device is in fully docked position. As shown in FIGS. 4 and 5A, the shoulder 250 serves to support the side edges of the computing device.

At the proximal end of the insert 112, side wall sections 252 overlap the inside surface of side wall sections 128 of the tray 110.

Figure 5B:
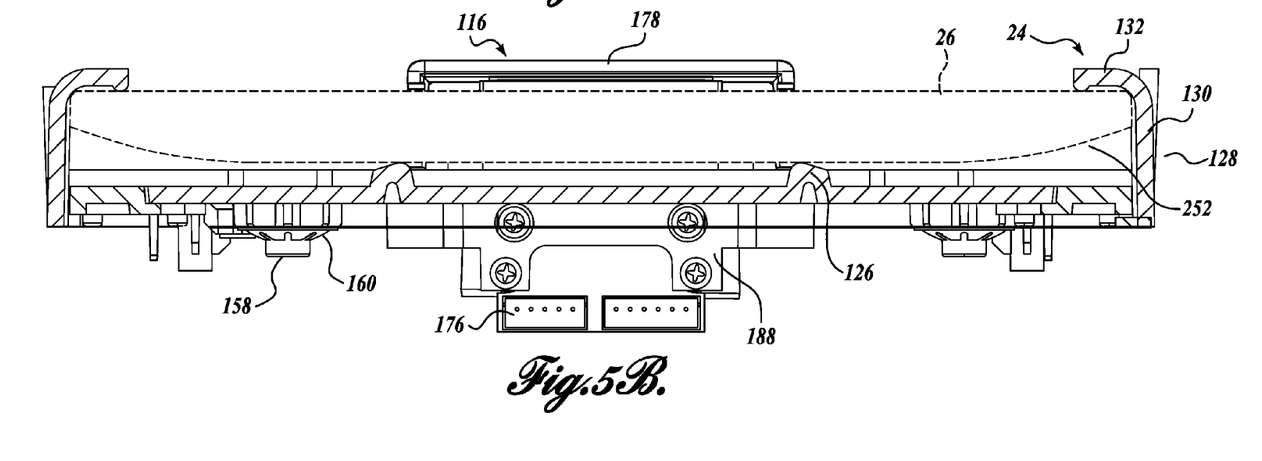
FIG. 5B is a view similar to FIG. 5A, but without an insert positioned on the docking tray.
Figure 6:
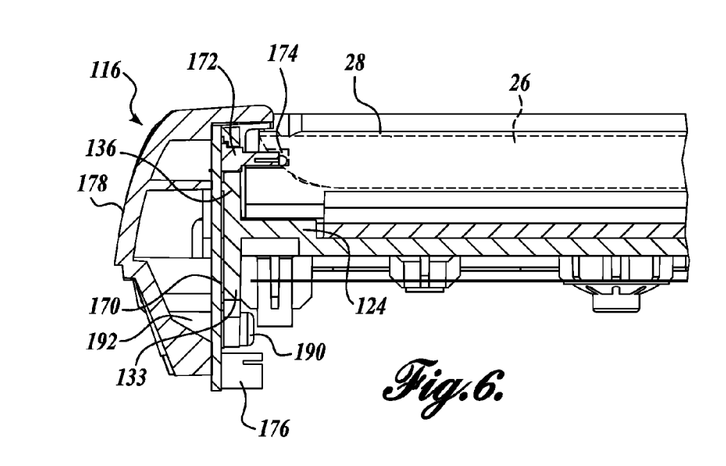
FIG. 6 is a third cross-sectional view of FIG. 3 taken along lines 6-6 thereof.

It will be appreciated that insert 112 serves as an adapter to accommodate a thinner computing device, see FIG. 5A, relative to when the insert is not utilized, see FIG. 5B. It will also be appreciated that the insert can be configured to accommodate computing devices that are narrower than computing device 26 and/or shorter than the computing device 126. In this regard, the shape of the insert would correspond to the shape of the computing device and also enable use of the connector bus assembly similar to bus assembly 116 and lock similar to lock 118. Also, a plurality of different adapters may be employed to enable the docking tray assembly to accommodate numerous different computing devices.

Moreover, it is to be recognized that the inserts of the present disclosure, including insert 112, enable computing devices of various configurations to be docked with the tray assembly without requiring and modification to the computing device or without the need for a spacer or other item(s) to be attached to the computing device.

In use, docking tray assembly 24 is mounted on the chassis 32, and then the computing device docked with tray assembly 24 by sliding the computing device into engagement with the docking tray 110, whether used alone or in conjunction with insert 112. When the computing device is slid sufficiently into engagement, the bus connector 172 engages within the bus port 174 of the computing device. Thereafter, the lock 118 is locked into place to securely retain the computing device in docked position with the docking tray assembly 24. The computing device may be removed from the docking assembly by reversing the foregoing process.

It will be appreciated that mixer 20 is a fully functioning mixer in the manner of existing DAW's, but with the advantage of being relatively small and quite portable. Also, the computing device 26 allows the use of the many audio and other applications for sound mixing and other functions, that are available (downloadable) for use with computing devices, such as tablet computers, smart phones and digital assistants.

While illustrative embodiments have been illustrated and described, it will be appreciated that various changes can be made therein without departing from the spirit and scope of the invention.

The embodiments of the invention in which an exclusive property or privilege is claimed are defined as follows:

1. A docking tray assembly for use with an audio mixer having a chassis with a control panel having control pots and with an audio panel having audio input and output connectors, the docking tray assembly chassis configured to dock a computing device, the computing device having a touch screen display and having an underside opposite to the screen display, the computing device operable to operate the audio mixer, the docking tray assembly:
   (a) configured to be insertable with a cavity formed in the chassis of the audio mixer;
   (b) configured to slidably receive the computing device in a direction lengthwise of the computing device; and
   (c) comprising a base and at least one slide rail extending along the docking tray assembly base to slidably bear against the underside of the computing device during the docking of the computing device with the docking tray assembly and to support the underside of the computing device above the docking tray assembly base.

2. The docking tray assembly of claim 1, comprising a plurality of slide rails extending along the docking tray assembly base to slidably bear against the underside of the computing device during the docking of the computing device with the docking tray assembly and to support the underside of the computing device above the docking tray assembly base.

3. A docking tray assembly of claim 2, comprising:
 (a) formed side walls extending laterally from the docking tray assembly base to laterally constrain the computing device when the computing device is docked on the docking tray assembly;
 (b) shoulders extending along the formed side walls at the intersection of the docking tray assembly base and the formed side walls to serve as a bearing surface for side portions of the computing device;
 (c) guide flange portions projecting from the formed side walls to restrain disengagement of the computing device from the docking tray assembly; and
 (d) wherein the formed side walls, shoulders, and guide flange portions cooperate to define a slide way for slidably receiving edge portions of the computing device as the computing device is slidably engaged with the docking tray assembly in the direction lengthwise of the computing device.

4. A docking tray assembly of claim 2, further comprising an insert cooperating with the docking tray assembly and configured to slidably receive a computing device of at least one specific configuration, the insert comprising:
 (a) a base to overlay the base of the docking tray assembly; and
 (b) at least one slide rail that nests over the at least one side rail of the docking tray assembly.

5. A docking tray assembly of claim 4, further comprising a plurality of inserts, each of the plurality of inserts configured to mate with the docking tray assembly and configured to slidably receive at least one computing device of a specific configuration, the plurality of inserts each comprising:
 (a) a base to overlay the base of the docking tray assembly; and
 (b) at least one slide rail that nests over the at least one side rail of the docking tray assembly.

6. A docking tray assembly of claim 1, further comprising an insert cooperating with the docking tray assembly and configured to slidably receive a computing device of at least one specific configuration, the insert comprising:
 (a) a base to overlay the base of the docking tray assembly; and
 (b) at least one slide rail that nests over the at least one side rail of the docking tray assembly.

7. A docking tray assembly of claim 6, further comprising a plurality of inserts, each of the plurality of inserts configured to mate with the docking tray assembly and configured to slidably receive at least one computing device of a specific configuration, the plurality of inserts each comprising:
 (a) a base to overlay the base of the docking tray assembly; and
 (b) at least one slide rail that nests over the at least one side rail of the docking tray assembly.

8. A docking tray assembly claim 1, further comprising:
 (a) formed side walls extending transversely from the docking tray assembly base for laterally constraining the computing device when the computing device is docked on the docking tray assembly;
 (b) shoulders extending along the formed side walls at the intersection of the docking tray assembly base and the formed side walls to serve as a bearing surface for side portions of the computing device;
 (c) guide flange portions projecting from the formed side walls to restrain disengagement of the computing device from the docking tray assembly; and
 (d) wherein the formed side walls, shoulders, and guide flange portions cooperate to define a slide way for slidably receiving edge portions of the computing device as the computing device is slidably engaged with the docking tray assembly in the direction lengthwise of the computing device.

9. An audio mixer adapted to dock a computing device having a screen display for operating the audio mixer and an underside opposite the screen display, the audio mixer having a chassis with a control panel having control pots and with an audio panel having audio input and output connectors, comprising:
 (a) a docking tray assembly configured for removably receiving the computing device by sliding engagement of the computing device with the docking tray assembly lengthwise of the computing device, the docking tray assembly configured to permit access to the screen display when the computing device is docked with the docking tray assembly;
 (b) wherein the chassis defining a cavity for receiving the docking tray assembly within the chassis so that the computing device is fully within the envelope of the chassis; and
 (c) wherein the docking tray assembly comprising a base and at least one slide rail extending along the docking tray assembly base to slidably bear against the underside of the computing device during the docking of the computing device with the docking tray assembly thereby to support the underside of the computing device above the docking tray assembly base.

10. An audio mixer of claim 9, wherein the chassis comprises portions defining a palm rest adjacent the chassis cavity, the palm rest presenting a surface on the chassis extending laterally of the docking tray cavity.

11. An audio mixer of claim 10, further comprising a plurality of slide rails extending along the chassis cavity to slidably bear against the underside of the computing device during the docking of the computing device with the docking tray assembly and to support the underside of the computing device above the docketing tray assembly base.

12. An audio mixer of claim 10, wherein the docking tray assembly comprises:
 (a) formed side walls extending upwardly from the docking tray assembly base for laterally constraining the computing device when the computing device is docked on the docking tray assembly;
 (b) shoulders extending along the formed side walls at the intersection with the docking tray assembly base and the formed side walls to serve as a bearing surface for side portions of the computing device;
 (c) guide flange portions projecting from the formed side walls at locations spaced from the shoulders to restrain disengagement of the computing device from the docking tray assembly; and
 (d) wherein the formed side walls, shoulders, and guide flange portions cooperate to define a slide way for slidably receiving edge portions of the computing device as the computing device is slidably engaged with the docking tray assembly in a direction lengthwise of the computing device.

13. An audio mixer of claim 12, further comprising an insert cooperating with the docking tray assembly and configured to slidably receive a computing device of at least one specific configuration, the insert comprising:
 (a) a base to overlay the base of the docking tray assembly; and (b) at least one slide rail that nests over the at least one side rail of the docking tray assembly.

14. An audio mixer of claim 13, further comprising a plurality of inserts, each of the plurality of inserts configured to mate with the docking tray assembly and configured to slidably receive at least one computing device of a specific configuration, the plurality of inserts each comprising:
   (a) a base to overlay the base of the docking tray assembly; and
   (b) at least one slide rail that nests over the at least one side rail of the docking tray assembly.

15. An audio mixer of claim 10, further comprising an insert cooperating with the docking tray assembly and configured to slidably receive a computing device of at least one specific configuration, the insert comprising:
   (a) a base to overlay the base of the docking tray assembly; and
   (b) at least one slide rail that nests over the at least one side rail of the docking tray assembly.

16. An audio mixer of claim 9, wherein the docking tray assembly comprises:
   (a) formed side walls extending upwardly from the docking tray base for laterally constraining the computing device when the computing device is docked on the docking tray assembly;
   (b) shoulders extending along the side walls at the intersection of the docking tray base and the formed side walls to serve as a bearing surface for side portions of the computing device;
   (c) guide flange portions projecting from the formed side walls to restrain disengagement of the computing device from the docking tray assembly; and
   (d) wherein the formed side walls, shoulders, and guide flange portions cooperate to define a slide way for slidably receiving edge portions of the computing device as the computing device is slidably engaged with the docking tray assembly in a direction lengthwise of the computing device.

17. An audio mixer of claim 9, further comprising an insert cooperating with the docking tray assembly and configured to slidably receive a computing device of at least one specific configuration, the insert comprising:
   (a) a base to overlay the base of the docking tray assembly; and
   (b) at least one slide rail that nests over the at least one side rail of the docking tray assembly.

18. An audio mixer of claim 9, further comprising an electromagnetic emissions shield positioned under the docking tray assembly.

* * * * *